US007200806B2

(12) United States Patent
Sahu

(10) Patent No.: US 7,200,806 B2
(45) Date of Patent: Apr. 3, 2007

(54) SYSTEM AND METHOD FOR GENERATING PRE-POPULATED FORMS

(75) Inventor: Smita Sahu, Kendall Park, NJ (US)

(73) Assignee: UBS AG, Weehawken, NJ (US)

( * ) Notice: Subject to any disclaimer, the term of this patent is extended or adjusted under 35 U.S.C. 154(b) by 309 days.

(21) Appl. No.: 10/280,846

(22) Filed: Oct. 25, 2002

(65) Prior Publication Data

US 2004/0083426 A1 Apr. 29, 2004

(51) Int. Cl.
*G06N 3/00* (2006.01)
(52) U.S. Cl. .................................................. 715/513
(58) Field of Classification Search ................ 715/505, 715/513, 517, 523, 530
See application file for complete search history.

(56) References Cited

U.S. PATENT DOCUMENTS

| | | | |
|---|---|---|---|
| 5,272,623 A | 12/1993 | Grubb et al. | |
| 5,655,130 A | 8/1997 | Dodge et al. | |
| 6,035,276 A | 3/2000 | Newman et al. | |
| 6,088,700 A * | 7/2000 | Larsen et al. | 715/505 |
| 6,182,095 B1 | 1/2001 | Leymaster et al. | |
| 6,212,530 B1 * | 4/2001 | Kadlec | 707/201 |
| 6,832,351 B1 * | 12/2004 | Batres | 715/505 |

OTHER PUBLICATIONS

"Indrayana Rustandi, Student Technology Assistant, Summer 1998," 1998, <http://rustandi.freeshell.org/sta/>, pp. 1-2.*
"Understanding UNIX permissions and chmod," Apr. 10, 1999, <http://web.archive.org/web/19991004065548/http://www.perlfect.com/articles/chmod.shtml>, pp. 1-4.*

* cited by examiner

*Primary Examiner*—Stephen Hong
*Assistant Examiner*—Kyle R. Stork
(74) *Attorney, Agent, or Firm*—Proskauer Rose LLP

(57) ABSTRACT

A method for generating pre-populated forms with stored data. A user identity and a customer identity are obtained where the user identity and customer identity identify a user and a customer, respectively. The identified user is verified as being authorized to access information related to the identified customer. If the identified user is verified, a form type identifier is obtained that identifies one of one or more types of forms, each of which has one or more input fields for receiving information. Then, a populated form of the type matching the form type identifier is generated with at least some of the input fields of the generated form being populated with data related to the identified customer. Finally, the generated form is transmitted as a byte stream to a user interface device where the byte stream is used to recreate the generated form.

31 Claims, 9 Drawing Sheets

600

| Form Type Identifier | Form Template Filename |
|---|---|
| IRA Application and Adoption Agreement Form | OAO_CL_IRA_FORM |
| ... | ... |

IRA Application and Adoption Agreement Form

710 — Last Name

720 — Tax Bracket

730 — Street Address 1

740 — State

IRA Application and Adoption Agreement Form — 810

| Form Field Label | Form Field Name/Customer Data Table Column Name | Customer Data Table Name |
|---|---|---|
| Last Name | IP_LAST_X | RCCV1100 |
| Tax Bracket | TAX_BRKT_C | RCCV1100 |
| Street Address 1 | ADS_LINE_T | RCAV4700 |
| State | ADS_ST_C | RCAV4700 |
| ... | ... | ... |

| RCCV1100 | | | |
|---|---|---|---|
| Customer ID No. | IP_LAST_X | TAX_BRKT_C | ... |
| 5532 | Doe | 16% | ... |
| 2523 | Smith | 39% | ... |
| ... | ... | ... | ... |

| RCAV4700 | | | |
|---|---|---|---|
| Customer ID No. | ADS_LINE_T | ADS_ST_C | ... |
| 2523 | 5 Main Street | New Jersey | ... |
| ... | ... | ... | ... |

920　　　930　　　940

| Form Field Name | Customer Data |
|---|---|
| IP_LAST_X | Smith |
| TAX_BRKT_C | 39% |
| ADS_LINE_T | 5 Main Street |
| ADS_ST_C | New Jersey |
| ... | ... |

FIG. 8

IRA Application and Adoption Agreement Form

Last Name  
Smith

Tax Bracket  
39%

Street Address 1  
5 Main Street

State  
New Jersey

FIG. 9

SYSTEM AND METHOD FOR GENERATING PRE-POPULATED FORMS

BACKGROUND OF THE INVENTION

The invention disclosed herein relates generally to computers for generating forms. More particularly, the present invention relates to a system and method for using a computer to generate forms pre-populated with stored data.

Forms are frequently used by organizations in connection with services performed for customers of the organization. For example, a service organization may require an employee to fill out a form each time a customer wishes to begin a new service or change an existing service. Typically, an employee accesses a customer information database to retrieve information related to the customer wishing to begin a new service or change and existing service. Then, the employee manually fills in a form related to the new or existing service using the customer information retrieved from the database.

Having employees manually fill in such forms is disadvantageous for the organization since the time spent filling in forms could be more profitably used by employees cultivating relationships with customers or marketing service products to customers. In addition, having employees manually fill in such forms is inefficient since incorrect or incomplete information relating to the customer is often entered.

Therefore, there is a need for a system and method for automating the process of filling in forms for customers to thereby reduce or eliminate employee time spent on this function and to increase the correctness of information filled in on forms.

SUMMARY OF THE INVENTION

The disadvantages above are overcome by a system and method for generating populated forms. The method involves obtaining a user identity and a customer identity, where the user identity and customer identity identify a user and a customer, respectively. The identified user is verified as being authorized to access information related to the identified customer. A form type identifier that identifies one of one or more types of forms is obtained if the identified user is verified, wherein each of the one or more types of forms has one or more input fields for receiving information. A populated form of the type matching the form type identifier is generated if the identified user is verified, where at least some of the input fields of the generated form are populated with data related to the identified customer. Finally, the generated form is transmitted as a byte stream if the identified user is verified.

Users, such as employees of an organization, operate User Interface Devices to communicate over a network with a Form Generation System that generates pre-populated forms based on data provided by the users. The Form Generation system communicates over the network with a Customer Reference Database and a Form Template Database. The Customer Reference Database stores data related to customers that is used to populate the forms to be generated. The Form Template Database stores form templates of all forms that may be generated by the Form Generation System.

The Form Generation System obtains the user's identity and a customer identity and then verifies that the identified user is authorized to access information related to the identified customer. If the user is not verified, processing terminates. If the user is verified, the Form Generation System provides an interface screen to the user via the User Interface Device operated by the user that lists the types of forms that may be generated. The user operates the User Interface Device to provide a form type identifier identifying the type of form from the list that is to be generated for the identified customer.

If the user is verified, the Form Generation System continues to generate a populated form of the type matching the form type identifier previously obtained. A form template of the type matching the previously obtained form type identifier is retrieved from the Form Template Database. A blank form of the type matching the previously obtained form type identifier is created based on the form template retrieved from the Form Template Database. Data related to the identified customer and corresponding to the input fields of the retrieved form template is retrieved from the Customer Reference Database. The retrieved data is used to populate the input fields of the blank form. The populated form that is generated is then transmitted to the user as a byte stream.

Additional aspects of the present invention will be apparent in view of the description which follows.

BRIEF DESCRIPTION OF THE FIGURES

The invention is illustrated in the figures of the accompanying drawings which are meant to be exemplary and not limiting, in which like references are intended to refer to like or corresponding parts, and in which:

FIG. 2 is a table showing example correlations between form type identifiers and form template filenames;

FIG. 3 is an example of a form template used by an embodiment of the present invention;

FIG. 4 is a table showing example correlations between form field names and customer data table names;

FIGS. 5A and 5B are tables showing example data for customers;

FIG. 8 is a table showing example form field names and customer data;

FIG. 9 is an example of a generated form pre-populated with customer data;

DETAILED DESCRIPTION OF THE INVENTION

The preferred embodiments of a method, system, and article of manufacture containing software programs in accordance with the present invention is described with reference to the drawings in FIGS. 1–12.

Figure 1:
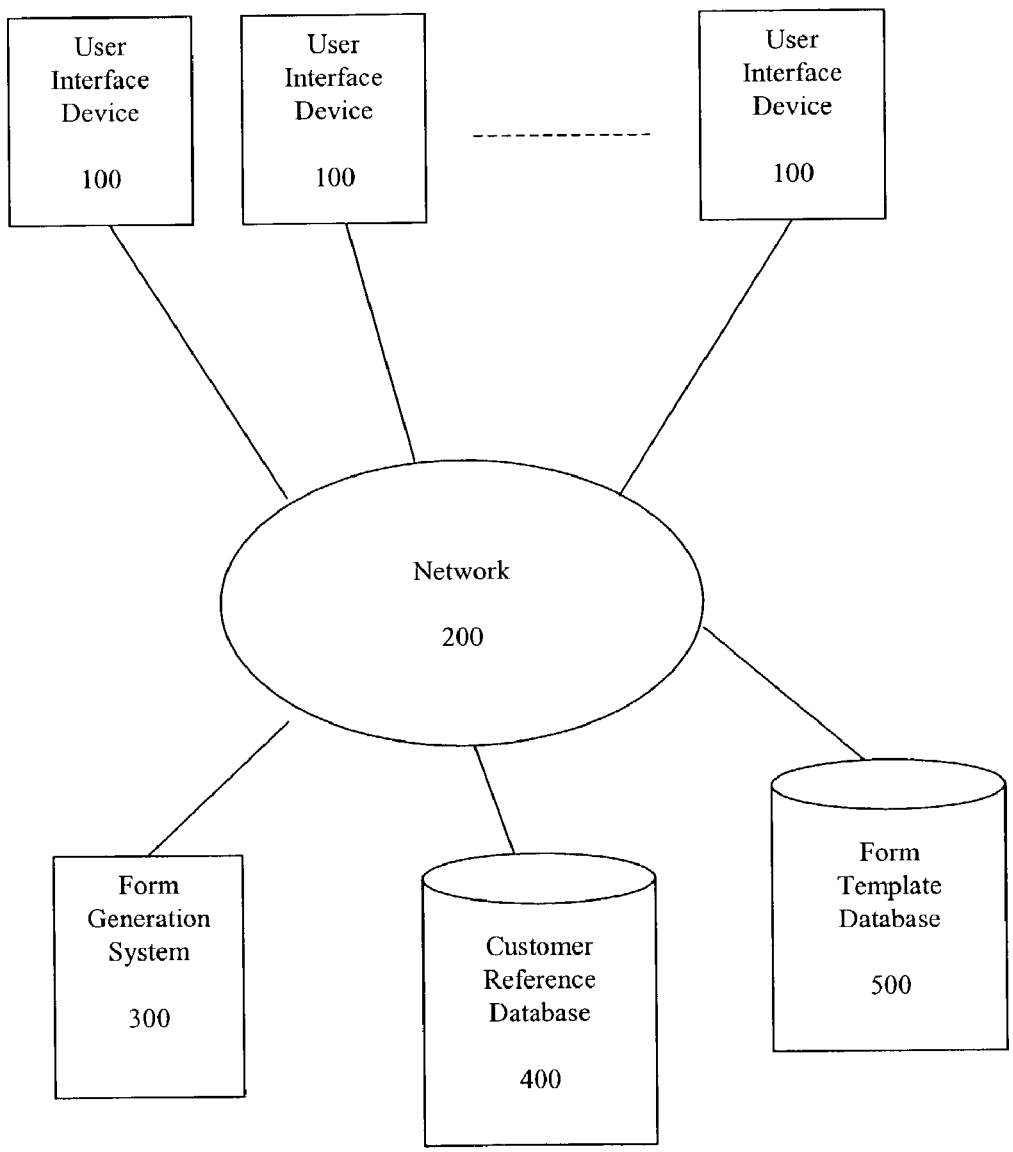
FIG. 1 is a block diagram showing an embodiment of the system of the present invention and the environment in which it operates.

FIG. 1 is a block diagram showing the structure and operating environment of an embodiment of the present invention. Users, such as employees of a financial services organization, operate User Interface ("UI") Devices 100 in order to communicate and interact with the Form Generation ("FG") System 300 through a network 200. UI Devices 100 may comprise any type of computer system that will enable a user to communicate over network 200 with FG System 300. For example, UI Devices 100 may comprise a personal computer equipped with standard web browser software where network 200 is the Internet or an Intranet and FG System 300 includes software enabling it to function as a web server.

Network 200 may comprise any type of communications network through which computers may communicate. For example, network 200 may comprise a LAN, a WAN, the Internet or an internal intranet. In addition, although FIG. 1 shows network 200 as a single network, it should be understood that network 200 may comprise a plurality of the networks previously described, all of which form a communication path linking UI Devices 100, FG System 300, Customer Reference ("CR") Database 400, and Form Template ("FT") Database 500.

Figure 6:
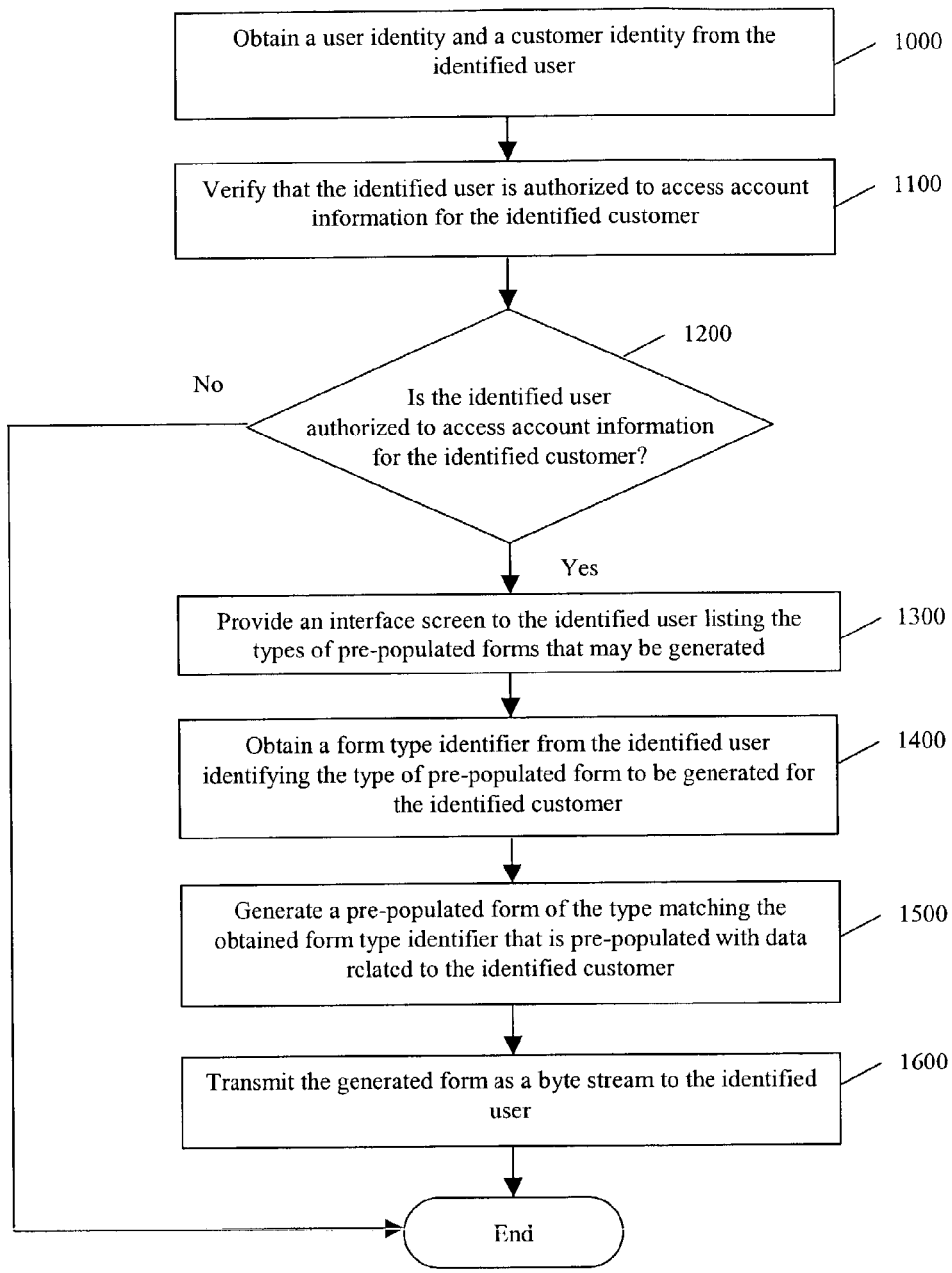
FIG. 6 is a flow chart showing an operative embodiment of the present invention.
Figure 7:
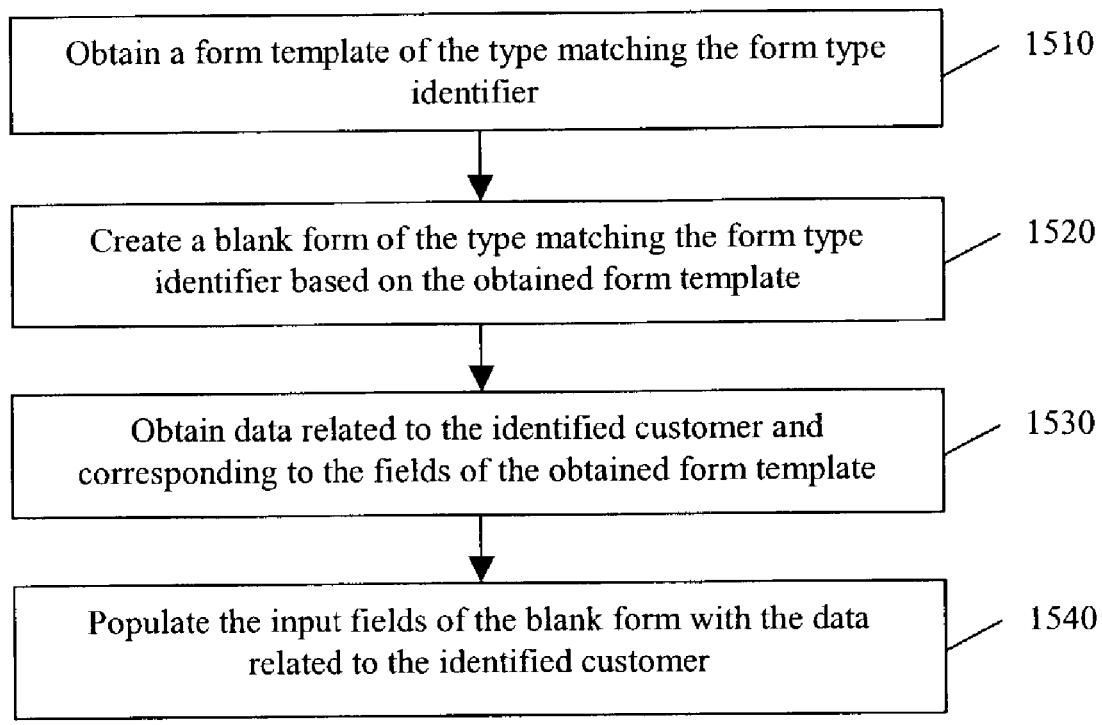
FIG. 7 is a flow chart showing another operative embodiment of the present invention.

FG System 300 may be any computer system that is capable of (a) communicating with UI Devices 100, CR Database 400, and FT Database 500 over network 200, and (b) operating according to the logic described below in accordance with FIGS. 6–8. For example, FG System 300 may comprise a computer server with computer code modules allowing it to communicate over network 200 with UI Devices 100, CR Database 400, and FT Database 500 and computer code modules allowing it to execute the logic described below in accordance with FIGS. 6–8. An example of computer code allowing FG System 300 to communicate with UI Devices 100 includes web server software, such as, for example, Netscape Enterprise Server™ v3.62 from Netscape Communications Corporation, where UI Devices 100 are equipped with standard web browser software. An example of computer code allowing FG System 300 to communicate with CR Database 400 includes middleware, such as, for example, DB2 Connect™ v6.1 from International Business Machines Corporation ("IBM"), where CR Database 400 comprises MVS DB2™ v6.0 database software from IBM.

As discussed below in connection with FIG. 2, a function performed by FG System 300 is to generate pre-populated forms. In an embodiment of the invention, FG System 300 includes computer code modules to perform this function, such as, for example, the Glance PDF Toolkit™ from Glance AG.

CR Database 400 may comprise any computer system capable of receiving and storing data and providing access to this stored data to other computer systems (e.g., via responses to search queries from those other systems). For example, CR Database 400 may comprise an OS/390™ server and MVS DB2™ v6.0 database software, both from IBM.

CR Database 400 may store: (a) a list of the filenames of the form templates stored in FT Database 500; (b) a list of field names for each form template stored in FT Database 500, where the list for a given form template identifies each input field in the form template; and (c) data related to customers of the organization.

CR Database 400 may store the list of filenames of the form templates in a table, which may be referred to as the Filename Table, which lists an identifier to each type of form stored, such as the name of the form type (e.g., "IRA Application and Adoption Agreement Form"), and the filenames of the files containing the corresponding form templates. FIG. 2 shows an example of the Filename Table 600 comprising two columns 610 and 620, where column 610 contains form type identifiers of each type of form stored in FT Database 500 and column 620 contains filenames of the form template files stored in FT Database 500 corresponding to each type of form. For example, row 1 of the Filename Table of FIG. 2 shows "OAO_CL_IRA_FORM" to be the filename of the form template stored in FT Database 500 corresponding to the type of form identified as "IRA Application and Adoption Agreement Form".

CR Database 400 may store the lists of field names corresponding to the form templates in separate tables, which may be referred to as Field Name Tables, where each table identifies each field of the corresponding form template and correlates each field of the form template to customer data stored in CR Database 400. Further explanation can be made with reference to FIGS. 3 and 4.

FIG. 3 presents an example of a form template 700 related to a financial service provided by a financial service organization, such as an IRA Application and Adoption Agreement Form. Form template 700 includes a plurality of input fields in which data is to be inputted, of which only input fields 710 through 740 are shown as examples. As shown in FIG. 3, the input fields 710, 720, 730, and 740 have the form labels of "Last Name", "Tax Bracket", "Street Address 1", and "State", respectively, which appear on the form template.

FIG. 4 presents an example of a Field Name Table 800. The Field Name Table 800 includes a field 810 identifying the form template to which the Field Name Table 800 corresponds, e.g., "IRA Application and Adoption Agreement Form". The Field Name Table 800 includes a row for each input field of the corresponding form template 700. Each row of the Field Name Table 800 contains three columns 820, 830, and 840. Column 820 corresponds to the Form Field Label of the input field. Column 830 corresponds to the Form Field Name of the input field. Column 840 corresponds to the name of the Customer Data Table containing the customer data related to that input field.

Note that the Form Field Name of an input field is identical to the name of the column of the Customer Data Table that stores customer data related to that input field. For instance, in the example of FIG. 4, column 830 of row 1 of Form Field Table 800 indicates "IP_LAST_X" to be the Form Field Name for that input field of the corresponding form template. As shown in FIG. 4, "IP_LAST_X" is also the name of the column of the Customer Data Table containing customer data related to that input field. Column 840 of row 1 of Form Field Table 800 indicates "RCCV1100" to be the name of the Customer Data Table containing customer data related to this input field of this form template. Consequently, customer data related to the input field "IP_LAST_X" of form template 700 can be found in column "IP_LAST_X" of customer data table "RCCV1100".

CR Database 400 may store data related to customers of the organization in one or more database tables, which may be referred to as Customer Data Tables. FIGS. 5A and 5B present examples of Customer Data Tables in CR Database 400 that store customer data. As shown in FIG. 5A, each Customer Data Table 900 includes a field 910 that provides the name of the table, e.g., "RCCV1100". The Customer Data Table 900 includes a row for each customer of the organization. Each row of the Customer Data Table contains a plurality of columns, of which columns 920, 930, and 940 are shown as examples. Column 920 corresponds to the customer identification number of the customer of the row. It should be noted that any data that uniquely identifies each customer may be used as a database key in place of a customer identification number, e.g., social security numbers. Each additional column of the Customer Data Table contains customer data specific to that table. For example, in the specific Customer Data Table example shown in FIG. 5A, column 930 is named "IP_LAST_X" and corresponds to the last name of the customer of the row and column 940 is named "TAX_BRKT_C" and corresponds to the tax bracket of the customer of the row.

FIG. 5B shows another specific example of a Customer Data Table. Here, as shown in field 910, the name of the Customer Data Table is "RCAV4700". Again, column 920 of the Customer Data Table corresponds to the customer identification number of the customer of the row. Here, column 930 is named "ADS_LINE_T" and corresponds to the street address of the customer of the row and column 940 is named "ADC_ST_C" and corresponds to the state of residence of the customer of the row.

FT Database 500 may comprise any computer system capable of receiving and storing data and providing access to this stored data to other computer systems (e.g., via responses to search queries from those other systems). FT Database 500 stores at least the form templates used to generate pre-populated forms and may store each form template in a separate file. If desired, FT Database 500 may also store a list of filenames of each form template rather than, or in addition to, CR Database 400.

The form templates stored in FT Database 500 may relate to forms of any type. Where, for example, the organization utilizing the invention is a financial services organization, then the form templates stored in FT Database 500 may relate to financial services offered by the organization. Also, the form templates stored in FT Database 500 may relate to forms of any format, including, for example, the PDF format from Adobe Systems Incorporated.

Computer system here is used broadly to mean computer hardware and software or computer software only. For example, in FIG. 1, FG System 300, CR Database 400, and FT Database 500 are shown as distinct systems. However, it should be understood that some or all of FG System 300, CR Database 400, and FT Database 500 may be co-resident on the same computer hardware. In addition, it should be understood that although FG System 300, CR Database 400, and FT Database 500 are shown as singular systems, each may comprise multiple computer hardware and software systems in communication with each other such that, as a group, they perform the functions of FG System 300, CR Database 400, or FT Database 500, respectively.

The general operation of an embodiment of the present invention may now be described with reference to the flow chart of FIG. 6. First, a user identity and a customer identity are obtained from the identified user, step 1000. For example, FG System 300 may present an initial interface screen to a user at a UI Device 100 that requests the user's identity (e.g., the user's employee number assigned to the user by the organization utilizing the invention) and a customer identity (e.g., a customer identification number assigned to a customer by the organization utilizing the invention). The user inputs the user's identity and the customer identity of the customer for whom forms are to be generated. The user identity and customer identity are then sent by the UI Device 100 being operated by the user over network 200 and received by FG System 300.

Next, the identified user is verified as having authority to access account information for the identified customer, step 1100. For example, FG System 300 may perform this verification by consulting a database storing user identities (e.g., employee numbers) and customer identifications (e.g., customer identification numbers) corresponding to each user identity, where the customer identifications corresponding to each user identity represent customers whose account information the user identified by the respective user identity has authority to access.

At step 1200, a determination is made as to whether the identified user is verified as having authority to access account information for the identified customer. If this determination is negative, then processing terminates.

If the determination of step 1200 is positive, processing continues with step 1300, where an interface screen is provided to the identified user listing the types of pre-populated forms that may be generated, step 1000. For example, FG System 300 may generate an interface screen listing the types of pre-populated forms that may be generated and send the screen over network 200 to the UI Device 100 being operated by the identified user.

If desired, the interface screen provided to the user may be customized for the identified customer. For example, certain services of the organization utilizing the invention may only be available to customers living in a particular state or having incomes of a particular level. FG System 300 may perform this customization by, for example, using the customer identity received from the user to query CR Database 400 to obtain data related to the identified customer, such as, for example, the customer's state of residence or annual income. FG System 300 may then consult predefined tables that correlate customer data to the types of forms that may be generated, e.g., a table showing which types of forms may be generated for which states of residence. FG System 300 may then create an interface screen listing the specific types of pre-populated forms that may be generated for the identified customer.

Returning to FIG. 6, next, a form type selection identifying the type of pre-populated form to be generated for the identified customer is obtained from the identified user, step 1400. For example, this form type selection may be obtained from the identified user where, from the interface screen provided, the identified user provides a form type identifier by, for example, selecting one of the types of pre-populated forms listed at the interface screen. The form type identifier is then sent by the UI Device 100 being operated by the identified user over network 200 where it is received and obtained by FG System 300.

Next, in step 1500, a pre-populated form of the type matching the obtained form type identifier is generated that is pre-populated with data related to the identified customer. One technique for generating a pre-populated form as required by step 1500 is shown in the flow chart of FIG. 7. First, a form template of the type matching the form type identifier is obtained, step 1510. For example, FG System 300 may use the form type identifier previously obtained (e.g., from the user or the computer system that called FG System 300) to access the Filename Table stored in CR Database 400 to locate the record having a form type identifier stored therein that matches the previously obtained form type identifier. Then, using the filename from the matching record, FG System 300 may access FT Database 500 to retrieve the form template file matching the filename.

Next, a blank form of the type matching the form type identifier is created based on the obtained form template, step 1520. For example, FG System 300 may copy the retrieved form template into memory so that it may be manipulated as described further below.

Next, data is obtained that is related to the identified customer and that corresponds to the fields of the obtained form template, step 1530. For example, first FG System 300 may access CR Database 400 to locate the Field Name Table 800 having a form type identifier stored in field 810 that matches the form type identifier previously obtained, and then retrieve all the Form Field Names stored in column 830 of the matching Field Name Table.

As described previously, each row of a Field Name Table corresponds to an input field of the form template to which the Field Name Table corresponds. Consequently, for each input field of the obtained form template, FG System 300 may obtain customer data corresponding to the respective input field in the following manner. First, the name of a Customer Data Table is obtained by retrieving the value contained in the Customer Data Table Name column of the row of the matching Field Name Table corresponding to the respective input field. Next, the name of a Customer Data Table Column is obtained by retrieving the value contained in the Form Field Name/Customer Data Table Column Name column of the row of the matching Field Name Table corresponding to the respective input field. Next, CR Database 400 is accessed to locate the Customer Data Table having a name that matches the Customer Data Table name obtained from the matching Field Name Table. Next, a row of the located Customer Data Table is found having a value in the Customer Identification Number column of the row that matches the previously obtained customer identity. Finally, in the matching row, a column is located whose name matches the Customer Data Table Column name obtained from the matching Field Name Table. The data contained in the matching column of the matching row of the located Customer Data Table is then the customer data corresponding to the respective input field. Where no data is contained in the matching column of the matching row, then no data, or alternatively a blank, is obtained for the respective input field.

Returning to FIG. 7, the next step performed is step 1540, where the input fields of the blank form are populated with the obtained data that is related to the identified customer. For example, FG System 300 may first create a data structure, e.g., a table, containing, for each input field of the obtained form template, the Form Field Name of the respective input field and the data related to the identified customer obtained in step 1530 that corresponds to respective input field. FG System 300 may then call a subprogram for generating a pre-populated form (such as contained in the Glance PDF Toolkit from Glance AG), passing the location of the blank form residing in memory and the created data structure as parameters. The subprogram then populates each input field of the blank form residing in memory with customer data contained in the data structure corresponding to the respective input field.

FIGS. 8 and 9 present examples of a data structure created and a pre-populated form generated, respectively, according to step 1540 described above. In the examples shown in FIGS. 8 and 9, the obtained customer identity is "2523", the obtained form type identifier is "IRA Application and Adoption Agreement Form", and the example values shown in FIGS. 4, 5A, and 5B are used in accordance with step 1540 described above.

Returning to FIG. 6, after a pre-populated form of the type matching the obtained form type identifier is generated, processing continues with step 1600, where the generated form is transmitted to the identified user as a byte stream. The UI Device being operated by the user then uses the received byte stream to recreate the pre-populated form.

Transmitting the generated form from memory as a byte stream is advantageous over other techniques, such as first storing the generated form as a file and then transmitting the file, because no storage space is required to store generated forms as files prior to transmission. In a large organization with many employees and customers where a large volume of pre-populated forms may be continually generated, transmitting generated forms as byte streams as opposed to files may result in substantial storage space savings.

As described above, the FG System 300 may use an interface screen to receive data, e.g., user identity, customer identity, and form type identifier, from a user. However, it should be noted that an interface screen need not be used in order for FG System 300 to obtain these items of information. For example, in alternative embodiments of the invention, another computer system may directly request that FG System 300 perform the form generation process and the other computer system may simply pass a user identity, customer identity, and form type identifier directly to FG System 300 as part of the request.

Figure 10:
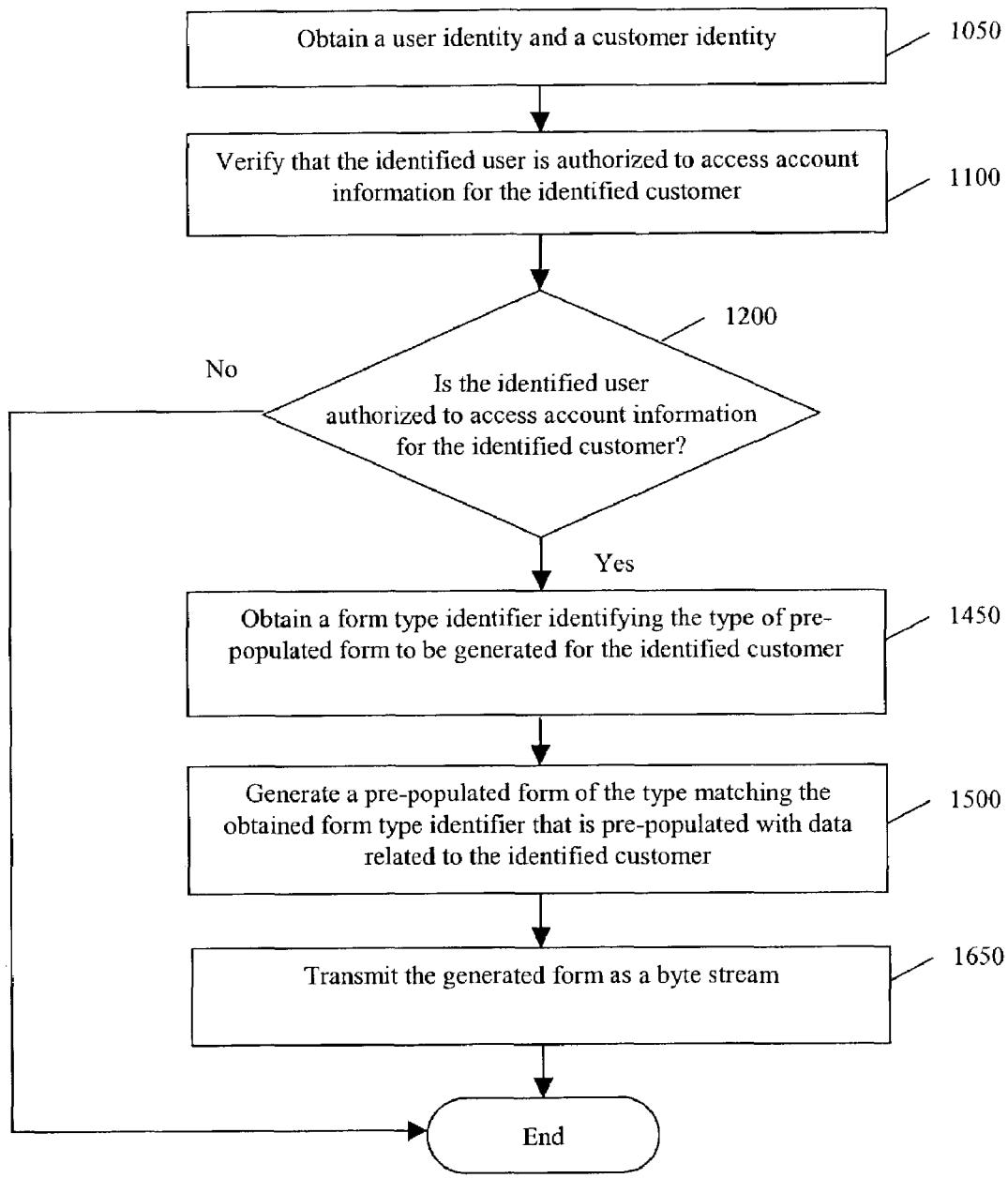
FIG. 10 is a flow chart showing another operative embodiment of the present invention.

FIG. 10 is a flow chart showing one such embodiment of the present invention where another computer system may supply the user identity, customer identity, and form type identifier directly to FG System 300. It should be noted that where steps shown in FIG. 10 have the same reference numbers as steps shown in FIG. 6, those steps of FIG. 10 are performed in a similar manner to the same numbered steps of FIG. 6 described above.

Returning to FIG. 10, first, a user identity and a customer identity are obtained, step 1050. For example, where another computer system directly communicates with FG System 300 to request that a pre-populated form be generated, this other computer system may supply a user identity and customer identity as part of the request. If, in steps 1100 and 1200, the identified user is not verified as being authorized to access account information for the identified customer, then processing terminates.

However, if the identified user is verified in steps 1100 and 1200, then processing continues with step 1450 where a form type identifier is obtained that identifies the type of pre-populated form to be generated for the identified customer. This may be accomplished by, for example, FG System 300 requesting that the other computer system transmit a form type identifier and then FG System 300 receiving the form type identifier sent from the other computer system in response to this request. Next, in step 1500, FG System 300 generates a pre-populated form of the type matching the obtained form type identifier that is pre-populated with data related to the identified customer. This may be accomplished in a similar manner as described previously in connection with FIG. 6. Returning to FIG. 10, after the pre-populated form is generated, FG System 300 may transmit the generated form as a byte stream to the other computer system, step 1650.

Figure 11:
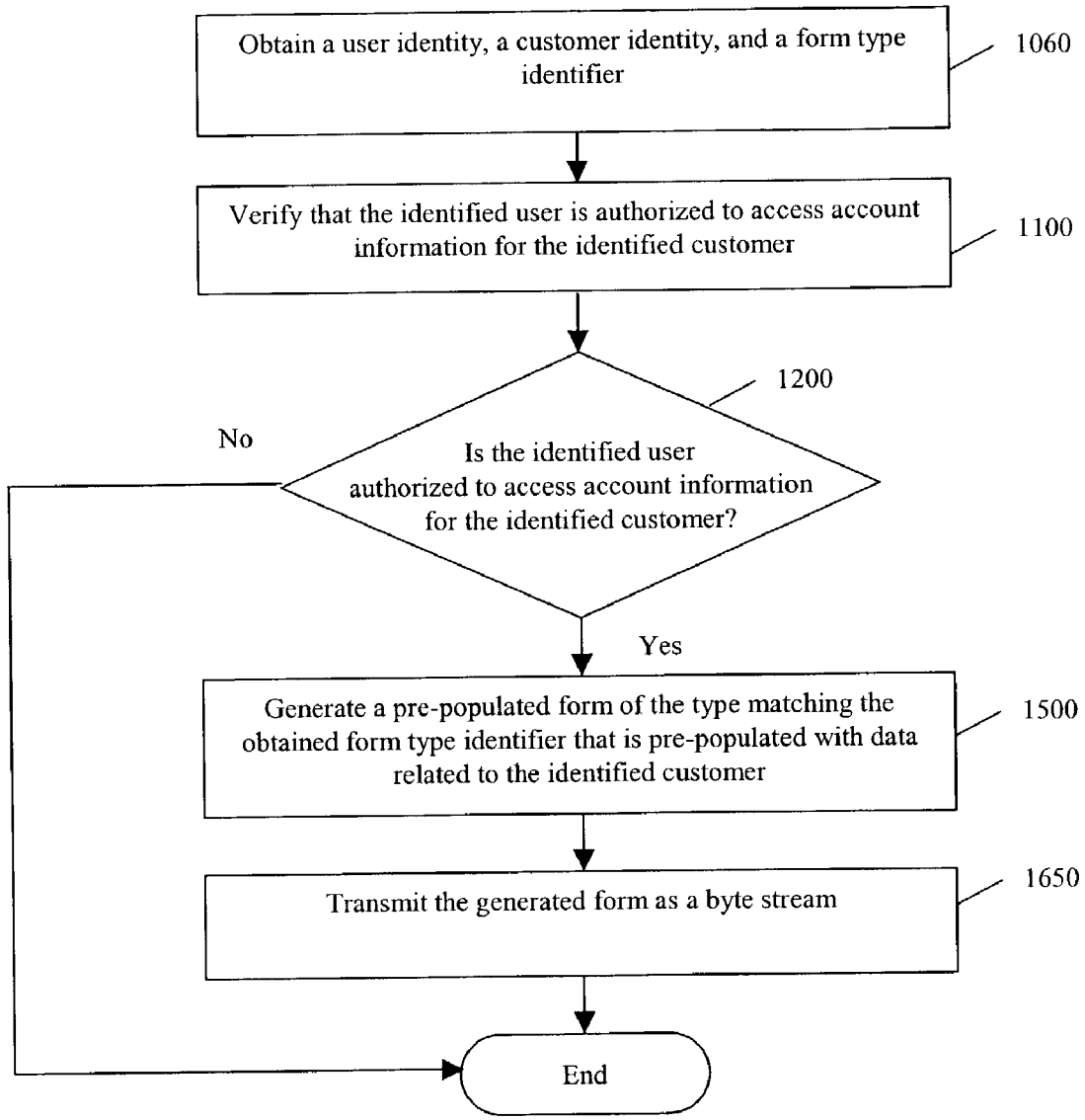
FIG. 11 is a flow chart showing another operative embodiment of the present invention.
Figure 12:
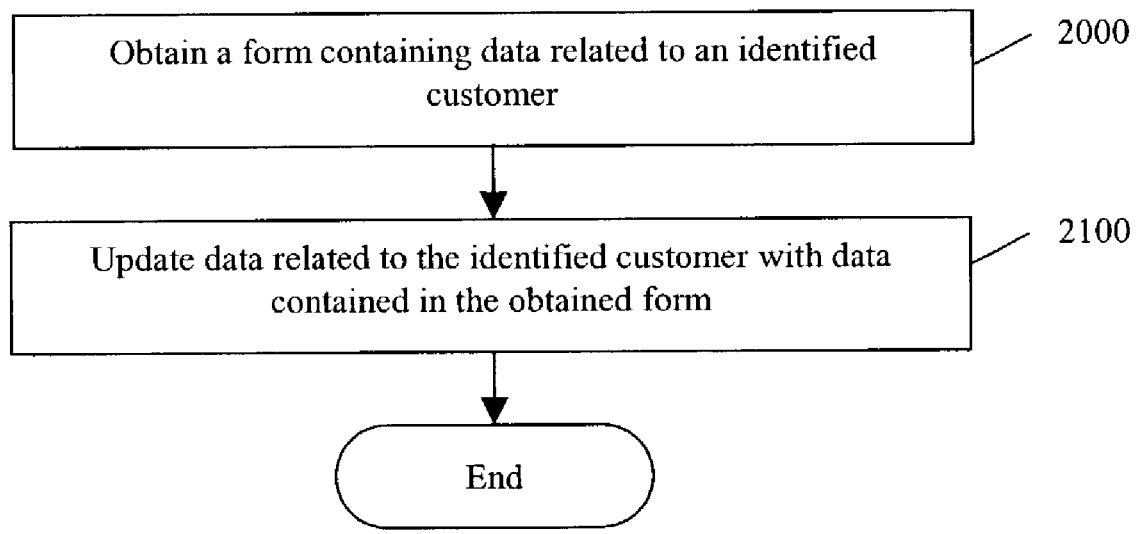
FIG. 12 is a flow chart showing another operative embodiment of the present invention.

Another embodiment of the present invention in which another computer system may supply information directly to FG System 300 is shown in the flow chart of FIG. 11. It should be noted that where steps shown in FIG. 11 have the same reference numbers as steps shown in previous figures, those steps of FIG. 11 are performed in a similar manner to the same numbered steps of the previous figures described above.

Returning to FIG. 11, first, a user identity, a customer identity, and a form type identifier are obtained, step 1060. For example, where another computer system directly communicates with FG System 300 to request that a pre-populated form be generated, this other computer system may supply a user identity, customer identity, and a form type identifier as part of the request. If, in steps 1100 and 1200, the identified user is not verified as being authorized to access account information for the identified customer, then processing terminates. However, if the identified user is verified in steps 1100 and 1200, then processing continues with step 1500 where FG System 300 generates a pre-populated form of the type matching the obtained form type identifier that is pre-populated with data related to the identified customer. This may be accomplished in a similar manner as described previously in connection with FIG. 6. Returning to FIG. 11, in step 1650, after the pre-populated form is generated, FG System 300 may transmit the generated form as a byte stream to the other computer system in a similar manner as discussed above in connection with FIG. 10.

In addition to generating pre-populated forms using previously stored customer data, FG System 300 may use populated forms to add or modify customer data. One technique through which this may be accomplished is shown in the flow chart of FIG. 12. First, a form containing data related to an identified customer is obtained, step 2000. For example, following the process shown in FIG. 6 where a generated, pre-populated form is presented to a user at an UI Device 100, the user may utilize the UI Device to update the data in the form, such as by inputting new data into unfilled fields or by modifying the data already contained in the form, and then this updated form may be transmitted from the UI Device and obtained by FG System 300. In another example of how step 2000 may be accomplished, following a process where, as described above in connection with FIGS. 10 and 11, a generated, pre-populated form is transmitted to another computer system, that computer system may update the data in the form and send the updated form back so that it is obtained by FG System 300.

Next, in step 2100, the data contained in the obtained form is used to update data related to the identified customer. For example, after FG System 300 obtains an updated form from either a user at a UI Device or another computer system, FG System 300 may use the data in the updated form to update the data stored in CR Database 400 that corresponds to the customer identified in the updated form. As described above in connection with FIGS. 2–5B, 8, and 9, the various fields of the forms that may be generated by FG System 300 correspond to particular data fields within CR Database 400. Thus, upon receiving the updated form, FG System 300 may locate the various data fields within CR Database 400 that correspond to the customer identified in the updated form and that also correspond to the fields of the updated form. FG System 300 then may copy the data from the updated form into the data fields of CR Database 400 that correspond to the identified customer and that also correspond to the fields of the updated form. Alternatively, FG System 300 may first compare the data from the updated form with the data contained in the data fields of CR Database 400 that correspond to the identified customer and that also correspond to the fields of the updated form, and then copy data from fields of the updated form to the corresponding data fields of CR Database 400 only if the data from the fields of the updated form is different from the data in the corresponding data fields of CR Database 400.

While the forgoing invention has been described in some detail for purposes of clarity and understanding, it will be appreciated by one skilled in the art, from a reading of the disclosure, that various changes in form and detail can be made without departing from the true scope of the invention in the appended claims.

What is claimed is:

1. A method for generating populated forms, the method comprising:
   in an operation of the method, obtaining a user identity, the user identity identifying a user;
   verifying that the user identified by the user identity is an employee of an organization authorized by the organization to generate populated forms on behalf of customers of the organization;
   if the user is verified as authorized in response to the obtained user identity, then obtaining, by input from the verified user, a customer identity identifying a customer;
   verifying that the customer identity is assigned by the organization to a customer to identify the customer as a verified customer of the organization;
   if the customer is verified in response to the customer identity as being a verified customer of the organization, then verifying that the verified user is authorized to access account information of the verified customer held by the organization, based on the user identity and the customer identity;
   if the verified user is not so authorized, then terminating the operation;
   if the verified user is verified as being authorized to access the account information of the verified customer, then providing to the verified user at least one form identifier, each form identifier identifying a respective type of form that is populatable, each type of form having one or more input fields for receiving information;
   selecting, by the verified user, an obtained form identifier of the provided at least one form identifier;
   generating, on behalf of the verified customer, a populated form of the type matching the obtained form type identifier, wherein at least one of the input fields of the generated form is populated with data based on information accessed from the account information of verified customer; and
   transmitting the generated form as a byte stream.

2. The method of claim 1, wherein:
   if the verified user is verified as being authorized to access the account information of the verified customer, then determining based on the account information of the verified customer which, of the types of forms are populatable on behalf of the verified customer, and then providing to the verified user only those form identifiers identifying respective types of forms that are populatable on behalf of the identified customer.

3. The method of claim 2, wherein the step of providing at least one form type identifier comprises providing a form type identifier identifying one or more types of forms, each of which corresponds to a financial service offered by a financial service organization.

4. The method of claim 2, further comprising the step of:
   providing an interface screen to a user via an user interface device operated by the user, wherein the interface screen lists one or more types of forms that may be generated; and
   wherein the step of providing at least one form type identifier comprises providing a form type identifier from the user via the user interface device, wherein the form type identifier is obtained through the user selecting one of the one or more types of forms listed on the interface screen.

5. The method of claim 4, wherein the step of transmitting the generated form as a byte stream comprises transmitting the generated form as a byte stream to the user interface device operated by the user.

6. The method of claim 5, wherein the step of generating a populated form of the type matching the form type identifier comprises:

obtaining a form template of the type matching the form type identifier;

creating a blank form of the type matching the form type identifier based on the obtained form template, wherein all the input fields of the blank form are empty;

obtaining data related to the verified customer and corresponding to at least some of the input fields of the obtained form template; and populating the at least some of the input fields of the blank form corresponding to the at least some of the input fields of the form template with the data related to the verified customer.

7. The method of claim 6 wherein the step of obtaining data related to the verified customer comprises obtaining data related to the verified customer from a database storing data related to a plurality of customers.

8. The method of claim 2, wherein the step of generating a populated form generates the populated form in a PDF format.

9. The method of claim 2, further comprising:

obtaining a second form containing data related to a second customer identified in the second form; and updating data related to the second customer identified in the second form using data contained in the obtained second form.

10. The method of claim 9, wherein the step of obtaining a second form comprises obtaining the previously generated form after the data contained in the previously generated form has been modified, and wherein the second customer is the identified customer.

11. The method of claim 2, wherein a database stores data related to a plurality of customers, and wherein the step of updating comprises updating data stored in the database corresponding to the second customer identified in the second form.

12. The computer program product of claim 2, wherein the method further comprises the step of:

providing an interface screen to a user via an user interface device operated by the user, wherein the interface screen lists one or more types of forms that may be generated; and wherein the step of providing at least one form type identifier comprises providing a form type identifier from the user via the user interface device, wherein the form type identifier is obtained through the user selecting one of the one or more types of forms listed on the interface screen.

13. The computer program product of claim 12, wherein the step of transmitting the generated form as a byte stream comprises transmitting the generated form as a byte stream to the user interface device operated by the user.

14. A system for generating populated forms, the system comprising:

a computer in communication with a network;

a database in communication with the network and the computer, wherein the database stores data related to a plurality of customers;

wherein the computer is configured to:

in an operation, obtain a user identity, the user identity identifying a user;

verify that the user identified by the user identity is an employee of an organization authorized by the organization to generate populated forms on behalf of customers of the organization;

if the user is verified as authorized in response to the obtained user identity, then obtain, by input from the verified user, a customer identity identifying a customer;

verify that the customer identity is assigned by the organization to a customer to identify the customer as a verified customer of the organization;

if the customer is verified in response to the customer identity as being a verified customer of the organization, then verify that the verified user is authorized to access account information of the verified customer held by the organization, based on the user identity and the customer identity; and if the verified user is not so authorized, then terminate the operation; and wherein, if the verified user is verified as being authorized to access the account information of the verified customer, the computer is further configured to:

provide to the verified user at least one form identifier, each form identifier identifying a respective type of form that is populatable, each type of form having one or more input fields for receiving information; and respond to a selection, by the verified user, of an obtained form identifier of the provided at least one form identifier by generating, on behalf of the verified customer, a populated form of the type matching the obtained form type identifier, wherein at least one of the input fields of the generated form is populated with data based on information accessed from the account information of verified customer; and transmit the generated form as a byte stream.

15. The system of claim 14, wherein:

if the verified user is verified as being authorized to access the account information of the verified customer, then the computer is configured to determine based on the account information of the verified customer which, of the types of forms are populatable on behalf of the verified customer, and then provide to the verified user only those form identifiers identifying respective types of forms that are populatable on behalf of the identified customer.

16. The system of claim 15, further comprising:

a user interface device operated by a user, wherein the user interface device is in communication with the network and the computer;

wherein the form identifier obtained by the computer is obtained from the user interface device operated by the user; and wherein the byte stream transmitted by the computer is transmitted to the user interface device operated by the user.

17. The system of claim 16, wherein each form identifier identifies one or more types of forms, each of which corresponds to a financial service offered by a financial service organization.

18. The system of claim 16, further comprising:

the user interface device provides an interface screen listing one or more types of forms that may be generated; and wherein each form identifier is obtained through the user selecting one of the one or more types of forms listed on the interface screen.

19. The system of claim 16, wherein the computer is configured to transmit the generated form as a byte stream to the user interface device operated by the user.

20. The system of claim 15, wherein the computer is configured to generate the populated form of the type matching the form type identifier by:
   obtaining a form template of the type matching the form type identifier;
   creating a blank form of the type matching the form type identifier based on the obtained form template, wherein all the input fields of the blank form are empty;
   obtaining data related to the verified customer and corresponding to at least some of the input fields of the obtained form template; and
   populating the at least some of the input fields of the blank form corresponding to the at least some of the input fields of the form template with the data related to the verified customer.

21. The system of claim 20, wherein the computer is configured to obtain data related to the identified customer from a database storing data related to a plurality of customers.

22. The system of claim 15, wherein the computer is configured to generate the populated form in a PDF format.

23. A computer program product comprising a computer usable medium having computer readable code embodied therein, the computer readable code, when executed, causing a computer to implement a method for generating populated forms, the method comprising:
   in an operation of the method, obtaining a user identity, the user identity identifying a user;
   verifying that the user identified by the user identity is an employee of an organization authorized by the organization to generate populated forms on behalf of customers of the organization;
   if the user is verified as authorized in response to the obtained user identity, then obtaining, by input from the verified user, a customer identity identifying a customer;
   verifying that the customer identity is assigned by the organization to a customer to identify the customer as a verified customer of the organization;
   if the customer is verified in response to the customer identity as being a verified customer of the organization, then verifying that the verified user is authorized to access account information of the verified customer held by the organization, based on the user identity and the customer identity;
   if the verified user is not so authorized, then terminating the operation;
   if the verified user is verified as being authorized to access the account information of the verified customer, then providing to the verified user at least one form identifier, each form identifier identifying a respective type of form that is populatable, each type of form having one or more input fields for receiving information;
   selecting, by the verified user, an obtained form identifier of the provided at least one form identifier;
   generating, on behalf of the verified customer, a populated form of the type matching the obtained form type identifier, wherein at least one of the input fields of the generated form is populated with data based on information accessed from the account information of verified customer; and
   transmitting the generated form as a byte stream.

24. The computer program product of claim 23, wherein the method further comprises:
   if the verified user is verified as being authorized to access the account information of the verified customer, then determining based on the account information of the verified customer which, of the types of forms are populatable on behalf of the verified customer, and then providing to the verified user only those form identifiers identifying respective types of forms that are populatable on behalf of the identified customer.

25. The computer program product of claim 24, wherein the step of providing at least one form type identifier comprises providing a form type identifier identifying one or more types of forms, each of which corresponds to a financial service offered by a financial service organization.

26. The computer program product of claim 24, wherein the step of generating a populated form of the type matching the form type identifier comprises:
   obtaining a form template of the type matching the form type identifier;
   creating a blank form of the type matching the form type identifier based on the obtained form template, wherein all the input fields of the blank form are empty;
   obtaining data related to the verified customer and corresponding to at least some of the input fields of the obtained form template; and
   populating the at least some of the input fields of the blank form corresponding to the at least some of the input fields of the form template with the data related to the verified customer.

27. The computer program product of claim 26, wherein the step of obtaining data related to the verified customer comprises obtaining data related to the verified customer from a database storing data related to a plurality of customers.

28. The computer program product of claim 24, wherein the step of generating a populated form generates the populated form in a PDF format.

29. The computer program product of claim 24, wherein the method further comprises:
   obtaining a second form containing data related to a second customer identified in the second form; and
   updating data related to the second customer identified in the second form using data contained in the obtained second form.

30. The computer program product of claim 29, wherein the step of obtaining a second form comprises obtaining the previously generated form after the data contained in the previously generated form has been modified, and wherein the second customer is the identified customer.

31. The computer program product of claim 24, wherein a database stores data related to a plurality of customers, and
   wherein the step of updating comprises updating data stored in the database corresponding to the second customer identified in the second form.

* * * * *